United States Patent Office 3,443,913
Patented May 13, 1969

3,443,913
PROCESS FOR PREPARING HIGH MOLECULAR WEIGHT LINEAR PHOSPHONITRILIC POLYMERS
Thomas Bieniek, Glen Burnie, and James M. Maselli, Ellicott City, Md., assignors to W. R. Grace & Co., New York, N.Y., a corporation of Connecticut
No Drawing. Filed Oct. 12, 1967, Ser. No. 674,759
Int. Cl. C01b 25/00; C08f 13/00
U.S. Cl. 23—357    3 Claims

ABSTRACT OF THE DISCLOSURE

Soluble linear phosphonitrilic chloride polymers of high molecular weight are prepared which are hydrolytically stable and useful as high temperature hydraulic fluids. Additionally, these polymers can be reacted further with other compounds to give resins and elastomers with useful high temperature properties.

---

This invention relates to the synthesis of soluble high molecular weight linear phosphonitrilic chloride polymers. In a more particular embodiment of this invention, it relates to the preparation of a high molecular weight linear phosphonitrilic chloride polymer family which can be reacted with various other compounds to give resins or elastomers with useful high temperature properties.

The phosphonitrilic halide polymer family has been investigated by many workers. However, useful materials have never been developed from the polymers, owing to the hydrolytic instability of the halogen-phosphorus bond. For instance, an "inorganic rubber" which is a phosphonitrilic halide, having a molecular weight of between 100,000 to 200,000, has a strong tendency to depolymerize and hydrolyze when heated above 350° C.

Recently, workers in the field have been experimenting with a resin system based on linear phosphonitrilic halide having less hydrolytically sensitive constitutents substituted in place of some or all of the halogen substituents.

However, to our knowledge it has not yet been possible in the art to successfully synthesize a higher molecular weight linear phosphonitrilic chloride polymer which is stable at high temperatures.

We have now produced just such a high molecular weight linear phosphonitrilic chloride polymer.

In summary, we have taken a linear phosphonitrilic chloride polymer, which is an insoluble (in benzene) oil having a molecular weight of 350–1500, and controllably heated this oil under nitrogen at about 250° C. for long periods of time. The product is a high molecular weight viscous oil, soluble in benzene, having a molecular weight between 3,000 and 10,000.

All molecular weight values given were determined using the vapor pressure osmometry technique.

It should be noted that the starting material used in our inventive process is produced by reacting an excess of phosphorus pentachloride with ammonium chloride under anhydrous conditions in a refluxing solvent. This process and the material produced (our starting material) are old in the art.

The viscous oil produced by our inventive process is useful as a high temperature fluid.

We will now more fully describe the process conditions.

The starting material which is produced using conventional methods, is a benzene-insoluble, waxy, linear phosphonitrilic polymer. Its formula is

wherein n is an integer from 3–15. It has a molecular weight of 700–1000.

The heating step to polymerize this starting material can be carried out at preferably 245–255° C., and operably at 240–260° C. This heating must be in an inert atmosphere, such as nitrogen or any inert gas. The pressure used is that of the atmosphere, or slightly higher than atmospheric. Generally, we can operate at a pressure of 1–2 atmospheres.

The time for completing the reaction is limited by two considerations: the final molecular weight of the product, and the risk of conversion of the product to the "inorganic rubber." This time can be predicted, however, by monitoring the phosphorus pentachloride evolved. $PCl_5$ is recovered as the heating progresses, according to the following postulated reaction:

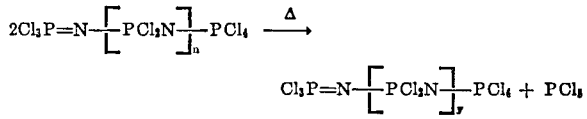

wherein $n$ is 3–15 and $y$ is an integer from about 10 to about 50.

Eventually the evolution of $PCl_5$ ceases and the molecular weight of the polymer thereafter increases rapidly. Generally, we have found that the end point of the polymerization occurs about 40 to 60 hours after the heating is first started. Of course, it is obvious that the greater times given in our ranges give correspondingly greater molecular weights in the final polymer product.

Additionally, we have found that our high molecular weight linear polymer product can be further reacted to obtain useful resins and polymers. It can be reacted for instance with phenol, hydroquinone and ammonia, fluoroalcohols and can also be aminated. Each of the reaction products has different and useful properties. These are more fully described hereinafter. The following examples will illustrate our inventive product. Product structures given were determined using NMR (nuclear magnetic resonance).

EXAMPLE 1

Preparation of the polymer product: soluble linear phosphonitrilic chloride

Granular ammonia chloride (23.3 grams or 0.454 mole) dried at 105° C. and phosphorus pentachloride (104.1 grams or 0.5 mole) were reacted together in 250 milliliters of dried freshly distilled chlorobenzene. The mixture was stirred and refluxed under dry nitrogen for 33 hours. Hydrogen chloride was collected and measured by titration with 2 normal sodium hydroxide. The reaction was quenched when 1.0 mole of hydrogen chloride had been evolved. (A theoretical 1.99 moles of hydrogen chloride would be evolved.)

Work-up of the reaction mixture yielded 9.2 grams or 0.17 mole of unreacted ammonium chloride: 56.6 grams of benzene-insoluble, chloroform-soluble, waxy, linear phosphonitrilic polymer (97% yield) and 2.15 grams of petroleum ether soluble white crystals (3% cyclic compounds). The polymer recovered had a molecular weight of 700 measured by vapor pressure osmometry.

This low molecular weight linear phosphonitrilic chloride was placed in a resin kettle fitted with a nitrogen inlet, a stirrer and an exhaust tube condenser. The resin kettle was heated to 250° C.±10° C. for a total of 55 hours while stirring under a blanket of dry nitrogen. Samples of the polymer were taken at selected intervals of time during the heating for molecular weight determination. The following Table I illustrates the data obtained.

TABLE I

| Time (hours): | Molecular weight (VPO) |
| --- | --- |
| Start | 700 |
| 10 | 1200 |
| 40 | 3200 |
| 55 | 6900 |

The product recovered having a molecular weight of 6900 was a viscous oil, soluble in benzene and chloroform. Infrared analysis indicated that it was a linear phosphonitrilic chloride polymer.

EXAMPLE 2

Using the same procedure described in Example 1 phosphorus pentachloride and ammonium chloride were reacted in reflexing chlorobenzene for 57 hours. HCl evolved was measured by titration with standard base. The reaction was stopped after 84.2% of the calculated HCl had evolved. Treatment of the oily residue remaining after removal of the chlorobenzene with petroleum ether left 200 grams of a low molecular weight linear phosphonitrilic chloride having a molecular weight of 900.

The low molecular weight phosphonitrilic chloride prepared in Example 2 was heated at 250 to 255° C. under nitrogen and at atmospheric pressure for 90 hours. Phosphorus pentachloride was observed to be evolved. At the end of the time indicated, 107 grams of a high molecular weight, linear phosphonitrilic chloride polymer was recovered having a molecular weight of 4400. This polymer was a dark orange viscous oil that remains soluble in benzene and chloroform.

The products prepared in Example 1 and 2 can be used as high temperature hydraulic fluids in sealed systems. Due to the solubility in benzene, they are also useful as coatings, and show good adhesion to glass and ceramic materials.

The products are also useful as reactants with certain chemicals, as illustrated by the following examples.

EXAMPLE 3

Reaction with phenol

The linear phosphonitrilic compound (M.W.=6900) prepared in Example 1 (16.0 grams) was dissolved in 100 milliliters anhydrous benzene and mixed with 26 grams of phenol dissolved in 50 milliliters of benzene. While the mixture was being stirred, triethylamine (42.0 grams) was added dropwise. The clear solution became turbid and was stirred for 23 hours at room temperature.

After the indicated time had elapsed, a 61% by weight yield of a polymeric resin having a molecular weight of 4200. This was black and rubbery, was soluble in benzene and chloroform and not sensitive to water.

Elemental analysis agreed with the idealized formula, and indicated that 60% of the chlorine in the starting material had reacted with the phenol.

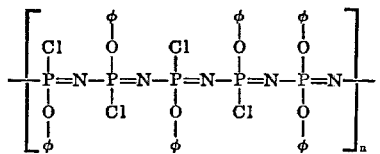

The calculated amounts of carbon, hydrogen, nitrogen, phosphorus, and chlorine for the idealized formula were respectively, 46.7, 3.4, 7.6, 17.6, and 15.3. The analysis measured for the compound was respectively, 48.4, 3.7, 7.6, 16.2, and 15.7.

EXAMPLE 4

The linear phosphonitrilic chloride polymer (M.W.= 6900) (20.2 grams) and phenol (32.8 grams) were dissolved into 170 milliliters of refluxing anhydrous benzene. Triethyl amine (45.9 grams) was added and the mixture was refluxed for 5 hours. The heating was discontinued and stirring continued for an additional 18 hours.

After this time had elapsed, a product was recovered (62% yield) which had a molecular weight of 10,700. It was soluble in benzene and chloroform. The infrared spectrum of this heavy black tar was identical to that of the resin having a molecular weight of 4200 in the previous example. Calculated analysis for the resin isolated in Example 4 for carbon, hydrogen, nitrogen, phosphorus and chlorine were, respectively 47.6, 3.5, 7.9, 14.3, and 17.6.

EXAMPLE 5

Amination of phenoxylated resin

The resin having a molecular weight of 10,700 prepared in Example 4 was dissolved in dry benzene, (10.1 grams of resin). Anhydrous ammonia was bubbled through the well-stirred solution for ½ hour. Two products were recovered by various water extraction methods. Resin A having a molecular weight of 11,500 was 2 grams of a tough, black, elastomeric material which dissolved in chloroform or benzene but not in water or methanol. Resin B having a molecular weight of 16,200 was a tar-like rubbery material which dissolved the chloroform and benzene. Both products did not evolve ammonia when contacted with a hot to normal sodium hydroxide solution. Infrared spectra of each of the two resins clearly show that NH₂ groups were present.

EXAMPLE 6

The resin obtained by the procedure of Example 4 was dissolved in 250 milliliters of dry chloroform (10.4 grams of resin). Ammonia was passed through the solution for 1½ hours. Two polymers were recovered: 6.15 grams of Resin A having a molecular weight of 6250, and 2.3 grams of Resin B having a molecular weight of 6950. Both were hard black elastomeric materials which dissolved in chloroform and benzene.

Elemental analysis of the four resins produced in Examples 5 and 6 indicated that NH₂ groups were substituted for the Cl groups. The probable structure is

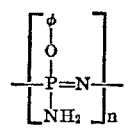

EXAMPLE 7

Reaction with hydroquinone

The linear phosphonitrilic chloride polymer (M.W.= 6900) as produced in Example 1 was dissolved in pyridine (10.15 grams of resin) and added slowly to a pyridine solution of hydroquinone (42.8 grams). The reaction mixture was refluxed under a stream of nitrogen for 17 hours. At the end of reflux period ammonia was condensed into the reaction flask in large excess so as to react with any PCl groups which remain unsubstituted by the hydroquinone.

The reaction products gave an acetone soluble black rubbery mass (8.8 grams). The sample had a melting point range of 174–184° C. Infrared spectrum revealed a 1200 centimeter⁻¹ P=N band and aromatic peaks. The resin was soluble in chloroform and benzene.

EXAMPLE 8

Reaction with fluoroalcohol

A linear phosphonitrilic chloride polymer having a molecular weight of 900 as produced following the procedure of Examples 1 and 2, was dissolved in 30 milliliters of anhydrous tetrahydrofuran (5.75 grams of resin) and added slowly to 80 milliliters of dry tetrahydrofuran that contained 1H,1H,3H-tetrafluoro - 1 - propanol (13.1 grams) and triethyl amine (10.1 grams). The reaction mixture became turbid and was refluxed for 2½ hours.

After the solvent had been removed under reduced pressure, diethyl ether was used to extract the polymer from the triethyl amine hydrochloride. After removal of the dietheyl ether a brown oil (10.7 grams) was recovered that had a molecular weight of 1300. The oil was a fluid of good thermal and hydrolytic stability. The product structure can be described as follows:

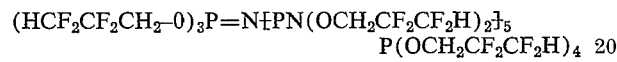

$(HCF_2CF_2CH_2-O)_3P=N\{PN(OCH_2CF_2CF_2H)_2\}_5$
$P(OCH_2CF_2CF_2H)_4$

EXAMPLE 9

Following the same general procedure in Example 10, linear phosphonitrilic chloride having a molecular weight of 7400 and dissolved in 40 milliliters of anhydrous benzene was slowly added to benzene that contained 1H,1H,3H-tetrafluoro-1-propanol and pyridine. The reaction mixture was refluxed for 16 hours. After cooling the reaction mixture separated into two layers. The top layer was a clear colorless liquid while the bottom layer was a brown oil. The bottom layer was washed several times with benzene and then dissolved as diethyl ether. The ether soluble fraction contained a pure polymeric oil which was recovered by evaporation of the ether. A yield of 50% of theoretical of a light yellow, highly viscous oil resulted. This polymer dissolved readily in ethanol, acetone and diethyl ether. It was only slightly soluble in chloroform and did not dissolve in benzene or water. The estimated molecular weight was in excesss of 10,000. Product structure was indicated to be:

$[-(HCF_2CF_2CH_2O)_2PN-]_n$

Analysis of this structure was calculated to be for carbon, hydrogen, nitrogen, phosphorus, fluorine and chlorine respectively, 23.4, 2.0, 4.6, 10.1, 46.9, and 0.0. The values experimentally measured for the respective amounts were 19.7, 1.8, 5.7, 12.5, 40.0, and 9.5.

Having fully described our invention, what is claimed is:

1. A process for preparing a linear phosphonitrilic chloride polymer which comprises heating at a temperature of 240–260° C.

$Cl_3P=N\{PCl_2N\}_nPCl_4$ wherein $n$ is 3–15 in an inert atmosphere for 40–60 hours, and recovering a product having a molecular weight between 3,000 and 10,000

2. The process of claim 1 in which the heating temperature is 245–255°C.

3. The process of claim 1 in which the inert atmosphere is nitrogen.

References Cited

UNITED STATES PATENTS

| | | | |
|---|---|---|---|
| 2,998,297 | 8/1961 | Gregor et al. | 23—357 |
| 3,026,174 | 3/1962 | Paddock | 23—357 |
| 3,249,397 | 5/1966 | Nichols | 23—357 |
| 3,348,926 | 10/1967 | Nielsen et al. | 23—357 |
| 2,192,921 | 3/1940 | Lipkin | 260—461 |
| 2,866,773 | 12/1958 | Redfarn | 260—47 |
| 2,876,247 | 3/1959 | Ratz et al. | 260—461 |
| 3,012,908 | 12/1961 | Bilger | 117—137 |
| 3,271,330 | 9/1966 | Evans | 260—2 |
| 3,304,350 | 2/1967 | Kober et al. | 260—973 |
| 3,370,020 | 2/1968 | Allcock et al. | 260—2 |

OTHER REFERENCES

Paddock et al.: Advances in Inorg. and Radiochem., vol. 1, pp. 351–53, 359–60 (1959).

Becke-Goehring et al., Berichte 92, pp. 1188–95 (1959).

WILLIAM H. SHORT, *Primary Examiner.*

M. GOLDSTEIN, *Assistant Examiner.*

U.S. Cl. X.R.

260—2, 32.8, 33.2, 33.4, 33.6, 33.8, 47, 926, 927